No. 855,476. PATENTED JUNE 4, 1907.
E. F. PRICE.
PROCESS OF PRODUCING CALCIUM CARBID.
APPLICATION FILED NOV. 14, 1905.

Witnesses:
Geo. E. Gauitt
J. B. Hill

Inventor:
Edgar F. Price,
by Byrnes & Townsend,
Att'ys.

UNITED STATES PATENT OFFICE.

EDGAR F. PRICE, OF NIAGARA FALLS, NEW YORK, ASSIGNOR TO UNION CARBIDE COMPANY, OF NIAGARA FALLS, NEW YORK, A CORPORATION OF VIRGINIA.

PROCESS OF PRODUCING CALCIUM CARBID.

No. 855,476.     Specification of Letters Patent.     Patented June 4, 1907.

Application filed November 14, 1906. Serial No. 287,340.

*To all whom it may concern:*

Be it known that I, EDGAR F. PRICE, a citizen of the United States, residing at Niagara Falls, in the county of Niagara and State of New York, have invented certain new and useful Improvements in Processes of Producing Calcium Carbid, of which the following is a specification.

U. S. patents numbers 750,096 and 760,312 to Alfred H. Cowles describe processes of producing calcium carbid by passing an electric current through a body of the charge, acting as a resistance conductor, melting the reduced carbid and running it out of the furnace through a tap-hole. It is not practicable to thus tap molten calcium carbid from an electric furnace unless it is either superheated or more heat is supplied to it at the tap-hole, its temperature of fusion being so high and the heat losses during its transit to and through the tap-hole being so great that it will otherwise become viscid or solid and clog the tap-hole. Calcium carbid has no definite melting point. When heated, it softens, becomes pasty and gradually liquefies. The difference between the temperatures of incipient liquefaction and complete fluidity is very great and when the carbid is heated to the temperature at which it will run through a tap-hole, it dissociates and the calcium distils off. Attempts have been made to lower the melting point of calcium carbid by fluxing it with or dissolving therein other substances, for instance calcium oxid. Such additions enable the carbid to be more readily tapped but render the product impure and uncommercial.

According to the present process, a charge of carbid-forming materials is progressively smelted by an electrically-heated resistance-conductor, and the reduced carbid is delivered into a receptacle which is shifted to withdraw its contents from the product remaining in the furnace. The charge is preferably employed as the resistance conductor, being supported in a stack furnace in the form of a downwardly-converging vertical column, the upper and lower portions of which are in contact with ring-electrodes. The hearth or crucible of the furnace is movable. As it becomes filled with pasty or molten carbid, it is moved laterally beneath the furnace to carry the body of carbid to a point of discharge. Duplicate hearths may be employed, the filled one being shifted away while an empty one is simultaneously moved beneath the furnace.

Figure 1:
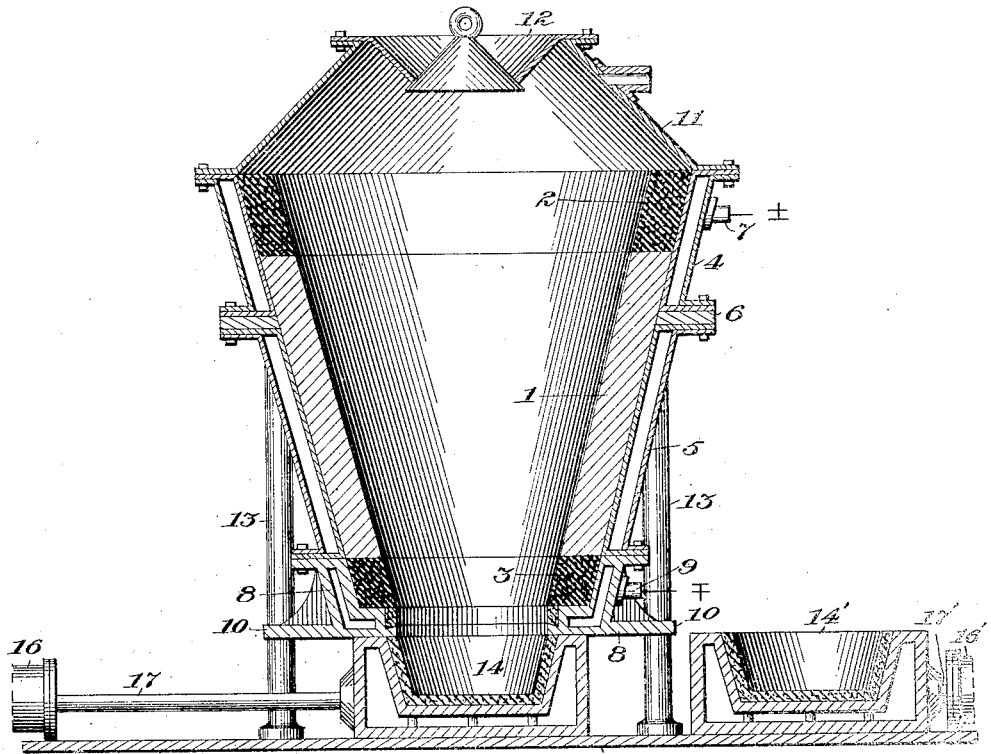
Figure 2:
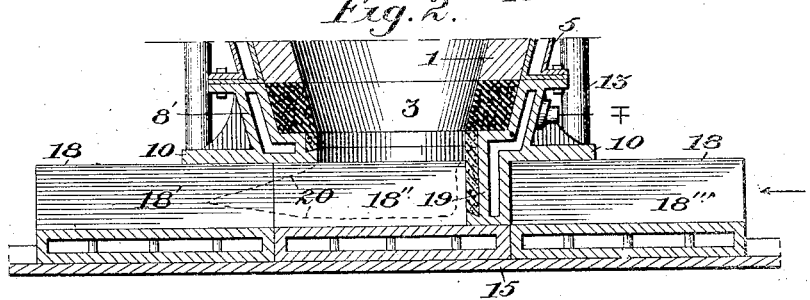

Referring to the accompanying drawing:—Figure 1 is an axial section of a suitable resistance furnace; and Fig. 2 is an axial section of the lower end of a resistance furnace having a modified hearth.

The furnace shown in Fig. 1 is a vertical stack comprising a downwardly-converging body 1 of a refractory non-conducting material, such as magnesia or siloxicon firebrick, at the upper and lower ends of which are carbon electrode-rings 2, 3. The body and upper electrode are surrounded by iron water-jackets 4, 5, between which is interposed an insulating ring 6. The upper water-jacket 4 is in contact with the electrode 2 and has an electric terminal 7.

The lower electrode 3 is supported in a water-jacketed steel casting 8 having an electric terminal 9. The casting 8 has lateral extensions 10 and its lower face is flat and smooth. The upper end of the furnace is closed by a conical iron ring 11 and a bell-and-hopper charging-mechanism 12. The furnace-body, with its electrodes and water-jackets, is supported upon pillars 13. Beneath the furnace body and closing its lower open end is a separate hearth or crucible 14, the upper edge of which is flat and makes a tight joint with the lower face of the casting 8 and its extensions 10. The hearth 14 is supported and arranged to reciprocate laterally on a horizontal bed-plate 15 or other suitable support. The hearth preferably consists of a rectangular steel casting, having a refractory lining and containing a chamber which is connected to flexible water-supply and discharge pipes. A duplicate hearth 14' is also supported on the bed-plate 15. At opposite sides of the furnace are long fluid-pressure cylinders 16, 16', the piston rods 17, 17' of which have heads arranged to bear against the outer surfaces of the movable hearths 14, 14'.

In employing this furnace to carry out the process, a charge which is electrically conductive or which will be converted into a conductor by the temperature of the furnace—for example, a mixture of lime and carbon—is fed into the stack until its upper portion lies in contact with the upper electrode-ring. If the charge is normally a poor conductor, initial current-paths between the electrodes are provided. The conductivity of the charge may be increased by using a mixture containing large pieces of coke which lie in contact with each other at various points. An electric current of sufficient amperage is then passed between the electrodes and through the charge, serving as a resistance-conductor. The charge is thereby heated, its temperature gradually increasing downward by reason of the decreasing cross-section and increasing current-density, to a zone where the materials react to form carbid and the carbid is brought into a molten condition. The carbid gradually accumulates in the movable hearth 14 and when this is nearly filled, the pusher 17' of the cylinder 16' is actuated to move the duplicate hearth 14' beneath and in contact with the lower face of the casting 8 and against the side of the hearth 14. The continued movement of the pusher then forces the hearth 14 with its charge of carbid gradually out from beneath the bottom of the furnace-chamber and simultaneously moves the duplicate hearth 14' into position to receive another body of carbid. The hearth 14 is discharged, as by inverting it, and is then ready to replace the duplicate hearth 14' when the latter is filled, the cylinder 16 and its piston rod 17 being actuated to move the hearth 14 into its original position. Water, liquid ammonia or other cooling medium is circulated through the chambers of the water-jackets, casting 8 and hearths, throughout the process, and fresh charge-materials are fed into the furnace as required.

Fig. 2 shows the lower end of a furnace which is identical in its general construction with that of Fig. 1, but which has a hearth consisting of an open trough 18, divided transversely into a number of abutting sections. The sections are arranged to slide on a bed-plate 15, with the flat upper faces of their sides in contact with the lower faces of the casting 8 and its extensions 10. The sections preferably have cooling chambers and may be lined, like the pan-hearths 14. A transverse water-cooled dam or partition 19 depends from the casting 8' and makes close contact with the bottom and sides of the trough - sections, thereby preventing the molten furnace-product from flowing into the incoming section 18'''. In operation, the row of abutting trough-sections is either continuously or intermittently moved along the bed-plate and beneath the open bottom of the furnace, and the molten or pasty product flows into and fills the trough, the portion lying within the dotted lines 20 remaining liquid or plastic while the portion filling the outgoing section 18' is solid or sufficiently rigid to prevent leakage from the furnace. As each filled section leaves the furnace, its contents is broken or cut off from that in the succeeding section and it is then emptied and transferred to the rear of the line of sections.

I claim:

1. The process of producing calcium carbid, which consists in smelting the charge by an electrically-heated resistance-conductor, accumulating a body of carbid, a portion of said body lying within a movable receptacle and a portion within the smelting chamber, and shifting the receptacle and thereby withdrawing its contents from the portion remaining in the furnace, as set forth.

2. The process of producing calcium carbid, which consists in smelting the charge by interposing it as a resistance-conductor in an electric circuit, accumulating a body of carbid, a portion of said body lying within a movable receptacle and a portion within the smelting chamber, and shifting the receptacle and thereby withdrawing its contents from the portion remaining in the furnace, as set forth.

3. The process of producing calcium carbid, which consists in smelting the charge by interposing it as a resistance-conductor in an electric circuit, increasing the current-density along the path of the current in the charge, accumulating a body of carbid, a portion of said body lying within a movable receptacle and a portion within the smelting chamber, and shifting the receptacle and thereby withdrawing its contents from the portion remaining in the furnace, as set forth.

4. The process of producing calcium carbid, which consists in smelting the charge by an electrically-heated resistance-conductor, accumulating a body of carbid, a portion of said body lying within a movable receptacle and a portion within the smelting chamber, shifting the receptacle and thereby withdrawing its contents from the portion remaining in the furnace, and moving an empty receptacle into position, as set forth.

5. The process of producing calcium carbid, which consists in progressively smelting the charge by an electrically-heated resistance-conductor, accumulating a body of carbid, a portion of said body lying within a movable receptacle and a portion within the smelting chamber, shifting the receptacle and thereby withdrawing its contents from the portion remaining in the furnace, and supplying charge-materials as required, as set forth.

6. The process of producing calcium carbid, which consists in progressively smelting the charge by interposing it as a resistance-conductor in an electric circuit, accumulating a body of carbid, a portion of said body lying within a movable receptacle and a portion within the smelting chamber, shifting the receptacle and thereby withdrawing its contents from the portion remaining in the furnace, and supplying charge-materials as required, as set forth.

7. The process of producing calcium carbid, which consists in progressively smelting the charge by interposing it as a resistance-conductor in an electric circuit, increasing the current-density along the path of the current in the charge, accumulating a body of carbid, a portion of said body lying within a movable receptacle and a portion within the smelting chamber, shifting the receptacle and thereby withdrawing its contents from the portion remaining in the furnace, and supplying charge-materials as required, as set forth.

8. The process of producing calcium carbid, which consists in progressively smelting the charge by an electrically-heated resistance-conductor, accumulating a body of carbid, a portion of said body lying within a movable receptacle and a portion within the smelting chamber, shifting the receptacle and thereby withdrawing its contents from the portion remaining in the furnace, moving an empty receptacle into position, and supplying charge-materials as required, as set forth.

In testimony whereof, I affix my signature in presence of two witnesses.

EDGAR F. PRICE.

Witnesses:
G. E. Cox,
D. Burgess.